(12) United States Patent
Hashimoto et al.

(10) Patent No.: US 10,631,650 B2
(45) Date of Patent: Apr. 28, 2020

(54) CORE MATERIAL OF VEHICULAR SEAT CUSHION

(71) Applicant: JSP Corporation, Tokyo (JP)

(72) Inventors: Keiichi Hashimoto, Kanuma (JP); Katsunori Hisamatsu, Kanuma (JP)

(73) Assignee: JSP Corporation, Tokyo (JP)

(*) Notice: Subject to any disclaimer, the term of this patent is extended or adjusted under 35 U.S.C. 154(b) by 0 days.

(21) Appl. No.: 16/489,033

(22) PCT Filed: Feb. 26, 2018

(86) PCT No.: PCT/JP2018/006958
§ 371 (c)(1),
(2) Date: Aug. 27, 2019

(87) PCT Pub. No.: WO2018/159528
PCT Pub. Date: Sep. 7, 2018

(65) Prior Publication Data
US 2020/0000235 A1    Jan. 2, 2020

(30) Foreign Application Priority Data

Feb. 28, 2017 (JP) .................................. 2017-035715

(51) Int. Cl.
*A47C 7/20* (2006.01)
*A47C 27/14* (2006.01)
(Continued)

(52) U.S. Cl.
CPC ................ *A47C 7/20* (2013.01); *A47C 27/14* (2013.01); *B29K 2023/12* (2013.01);
(Continued)

(58) Field of Classification Search
CPC .. B60N 2/90; B29K 2023/12; B29K 2705/12; B29L 2031/771; A47C 7/20; A47C 27/14
(Continued)

(56) References Cited

U.S. PATENT DOCUMENTS 6,956,067 B2 * 10/2005 Sasaki ...................... C08J 9/224
                                                            264/50
7,531,116 B2 *  5/2009 Sasaki ........................ C08J 9/18
                                                            264/51
(Continued)

FOREIGN PATENT DOCUMENTS

JP    H05-154929 A    6/1993
JP    2015-174340 A   10/2015
(Continued)

OTHER PUBLICATIONS

International Search Report issued in PCT/JP2018/006958; dated May 29, 2018.
Written Opinion issued in PCT/JP2018/006958; dated May 29, 2018.

*Primary Examiner* — Mark R Wendell
(74) *Attorney, Agent, or Firm* — Studebaker & Brackett PC (57) ABSTRACT

Provided is a core material of a seat cushion for a vehicle. The core material includes: a thermoplastic resin expanded beads molded article 2 that has a substantially rectangular shape in a top view, the rectangular shape having a long side and a short side; and an annular reinforcing member 3 that is insert-molded in the peripheral edge part of the expanded beads molded article. A missing part 4 is formed in the expanded beads molded article, the missing part passing through in the thickness direction. A slit 7 is formed in at least one corner of the lightening part, the slit being oriented outward from the expanded beads molded article from the vicinity of the corner part.

6 Claims, 4 Drawing Sheets

(51) Int. Cl.
    *B60N 2/90*     (2018.01)
    *B29K 23/00*    (2006.01)
    *B29K 705/12*   (2006.01)
    *B29L 31/00*    (2006.01)

(52) U.S. Cl.
    CPC ..... *B29K 2705/12* (2013.01); *B29L 2031/771* (2013.01); *B60N 2/90* (2018.02)

(58) Field of Classification Search
    USPC .................................................. 297/452.48
    See application file for complete search history.

(56) References Cited

U.S. PATENT DOCUMENTS

| | | | | |
|---|---|---|---|---|
| 8,690,240 | B2* | 4/2014 | Takakura | B60N 2/5816 297/218.1 |
| 2011/0109133 | A1* | 5/2011 | Galbreath | A47C 7/748 297/217.3 |
| 2016/0114710 | A1* | 4/2016 | Edgar | B60N 2/66 297/452.48 |
| 2017/0252952 | A1 | 9/2017 | Takayama et al. | |
| 2017/0334106 | A1 | 11/2017 | Sameshima et al. | |
| 2018/0257526 | A1* | 9/2018 | Kumagai | B60N 2/90 |
| 2018/0368578 | A1* | 12/2018 | Takayama | B60N 2/90 |
| 2019/0014907 | A1* | 1/2019 | Hisamatsu | B60N 2/90 |
| 2019/0099002 | A1* | 4/2019 | Murata | A47C 7/20 |
| 2019/0217759 | A1* | 7/2019 | Sakakibara | A47C 7/20 |

FOREIGN PATENT DOCUMENTS

| | | | |
|---|---|---|---|
| JP | 2016167108 | * | 8/2016 |
| JP | 2018-029655 A | | 3/2018 |
| WO | 2016/042759 A1 | | 3/2016 |
| WO | 2016/152530 A1 | | 9/2016 |

* cited by examiner

CORE MATERIAL OF VEHICULAR SEAT CUSHION

TECHNICAL FIELD

The present invention relates to a core material of a seat cushion for a vehicle made of a thermoplastic resin expanded beads molded article in which a reinforcing member is buried.

BACKGROUND ART

In recent years, as a core material of a seat cushion for a vehicle, a core material of a seat cushion for a vehicle in which a reinforcing member made of metal and the like is buried in and integrated into a thermoplastic resin expanded beads molded article (hereinafter sometimes simply referred to as "expanded beads molded article") is used. In this case, the reinforcing member buried in the expanded beads molded article functions as a structural frame for attaching to a vehicle body, a structural frame for seat arrangement, a reinforcing material during collision, and the like.

As a member formed by integrating an expanded beads molded article and a reinforcing member, a composite expanded beads molded article composed of a base foam resin layer and the reinforcing member disposed inside the base foam resin layer has been proposed, in which a foam layer of a foamable resin covering the reinforcing member is engaged or fused with the base foam resin layer (see, for example, Patent Literature 1).

Such a composite expanded beads molded article is manufactured, for example, by so-called insert molding, in which a reinforcing member is disposed at a predetermined position in a mold, and then the expanded beads constituting the base is filled in the mold, heated, and fused.

CITATION LIST

Patent Literature

Patent Literature 1: JP-A-H05(1993)-154929

SUMMARY OF INVENTION

Technical Problem

Incidentally, the expanded beads molded article generally undergoes molding shrinkage after in-mold molding by a mold. In the composite expanded beads molded article in which the expanded beads molded article having such a property and the reinforcing member are fused and integrated, warping may occur after in-mold molding due to a difference in shrinkage ratio between the expanded beads molded article and the reinforcing member. In the case where the composite expanded beads molded article in which such warping remains is used as the core material of a seat cushion for a vehicle, there is a risk that the precision of attachment to the vehicle body is deteriorated or a predetermined performance cannot be secured.

As a measure for solving these problems, there is considered a method in which the shrinkage ratio after molding of the expanded beads molded article is predicted in advance, and the expanded beads molded article and the reinforcing member are warped in a reverse direction in advance to form a shape free of warping after shrinkage.

However, since the shrinkage ratio of the expanded beads molded article after molding also differs depending on the type of thermoplastic resin expanded beads to be used, the manufacturing conditions, the material of the reinforcing member, and the like, and is influenced by the shape of the expanded beads molded article and the arrangement state of the inserted reinforcing member, it is difficult to accurately predict the degree of warping of the expanded beads molded article each time. In a case where a composite expanded beads molded article with a complicated shape such that a missing part passing through in the thickness direction is formed, in particular, in order to get away from a convex portion of the vehicle, or in order to secure the thickness of a soft synthetic resin foam such as soft foamed urethane which is laminated on a core material in a later process, this problem has appeared remarkably.

In consideration of the fact of the background art described above, an object of the present invention is to provide a core material of a seat cushion for a vehicle, which is made of a thermoplastic resin expanded beads molded article into which a reinforcing member is integrated by insert molding, which has less warping and excellent dimensional precision.

Solution to Problem

In order to solve the problems described above, the present invention is a core material of a seat cushion for a vehicle described in the following [1] to [6].

[1] A core material of a seat cushion for a vehicle including: a thermoplastic resin expanded beads molded article having a substantially rectangular shape in a top view having a long side and a short side; and an annular reinforcing member that is insert-molded in a circumferential portion of the thermoplastic resin expanded beads molded article, in which at least one missing part passing through in the thickness direction and having at least one corner is formed in the thermoplastic resin expanded beads molded article, and a slit extending toward an outside of the expanded beads molded article from the vicinity of at least one of the corner is formed.

[2] The core material of a seat cushion for a vehicle according to [1], in which the slit extends toward the outside in a short side direction of the thermoplastic resin expanded beads molded article.

[3] The core material of a seat cushion for a vehicle according to [1] or [2], in which the thermoplastic resin expanded beads molded article has a short side direction as a front-rear direction of the vehicle and has three missing parts arranged in a long side direction, two missing parts located on both sides in the long side direction of the three missing parts having corner portions on the front and inner side in the long side direction, the slits extending toward the front side of the thermoplastic resin expanded beads molded article from the vicinity of each corner portion.

[4] The core material of a seat cushion for a vehicle according to [3], in which the missing part located at the center of the three missing parts has two corners on the front side, the slits each extending from the vicinity of each of the corner portions toward the front side of the thermoplastic resin expanded beads molded article.

[5] The core material of a seat cushion for a vehicle according to any one of [1] to [4], in which a maximum thickness of the thermoplastic resin expanded beads molded article is 150 mm or less.

[6] The core material of a seat cushion for a vehicle according to any one of [1] to [5], in which the slit is formed to have a length reaching the reinforcing member or a length such that the slit reaches an inward position greater than 0 mm and not more than 150 mm away from the reinforcing member.

ADVANTAGEOUS EFFECTS OF INVENTION

According to the core material of a seat cushion for a vehicle of the present invention, since the slit extending in the specific direction is formed at a specific position of the missing part passing through in the thickness direction formed in the expanded beads molded article, warping due to the difference in shrinkage ratio between the expanded beads molded article and the reinforcing member is effectively relieved due to the presence of the slit, a core material of a seat cushion for a vehicle which has less warping and excellent dimensional precision can be provided.

DESCRIPTION OF EMBODIMENTS

Hereinafter, a core material of a seat cushion for a vehicle of the present invention will be described in detail.

The core material of a seat cushion for a vehicle according to the present invention is a core material of a seat cushion for a vehicle including: a thermoplastic resin expanded beads molded article having a substantially rectangular shape in a top view having a long side and a short side; and an annular reinforcing member that is insert-molded in a circumferential portion of the thermoplastic resin expanded beads molded article, in which a missing part passing through in the thickness direction is formed in the thermoplastic resin expanded beads molded article, and a slit extending toward an outside of the expanded beads molded article is formed in at least one corner portion of the missing part from the vicinity of the corner portion. Hereinafter, the "thermoplastic resin expanded beads molded article" is also simply referred to as an "expanded beads molded article".

The thermoplastic resin constituting the expanded beads molded article can be appropriately selected. For example, the present invention can be suitably applied to the case where a polystyrene resin; a polyolefin resin such as polyethylene or polypropylene; a polyester resin such as polyethylene terephthalate or polylactic acid; or a composite resin of a polystyrene resin and a polyolefin resin is used. Among them, in the case where a resin containing a polyolefin resin which is easy to shrink due to being a crystalline resin, in particular, since the effect of the present invention for preventing warping can be remarkably exhibited, it is more preferable to use a polyethylene resin, a polypropylene resin, or a composite resin of a polystyrene resin and a polyolefin resin, and it is further more preferable to use a polypropylene resin.

The thermoplastic resin expanded beads molded article in which the reinforcing member is integrated by insert molding can be manufactured by a known method.

For example, a dispersing medium (usually water) and optionally a surfactant is added to a pressurizable sealed container such as an autoclave, and the above-described thermoplastic resin particles are dispersed therein, and the foaming agent is injected and the resin particles are impregnated with the foaming agent by stirring under heating. Then, the resin particles impregnated with the foaming agent are discharged from the inside of the container under high temperature and high pressure to a low-pressure region (usually at atmospheric pressure) together with the dispersion medium to manufacture expanded beads expanded at a predetermined magnification. Next, a mold in which the reinforcing member is arranged in a predetermined position in advance is filled with the expanded beads, and in-mold molding is performed by introducing steam to fuse the expanded beads, the reinforcing member and the expanded beads molded article are integrated, thus the expanded beads molded article in which the reinforcing member is buried can be manufactured as an integral molded article.

The reinforcing member used in the present invention is not particularly limited as long as the reinforcing member is used as a reinforcing member of the core material of a seat cushion for a vehicle. Examples thereof include metal reinforcing members made of iron, aluminum, copper, and the like, resin reinforcing members made of an engineering plastic, a glass fiber reinforced resin, and the like, and these may be appropriately combined. The shape of the reinforcing member is not particularly limited as long as the reinforcing member functions as an attachment to the vehicle body or a reinforcement during collision, but is at least an annular shape that can be disposed at the circumferential portion of the thermoplastic resin expanded beads molded article. In a case of the annular reinforcing member, one has reinforcing members having different rigidities connected to each other, for example, the front side requiring the highest strength may be formed of a reinforcing member having a high rigidity, and both sides and the rear side may be formed of linear reinforcing members thinner than the front side, or may be formed by interposing a different material in a part thereof. Further, when the reinforcing member is an annular reinforcing member having a substantially quadrangular shape in the top view, the shape of the front side half and the shape of the rear side half may be different. When the reinforcing members whose material and shape are asymmetric in front and rear are buried in the expanded beads molded article as described above, it is further difficult to predict the degree or direction of warping occurring in the core material.

Figure 2:
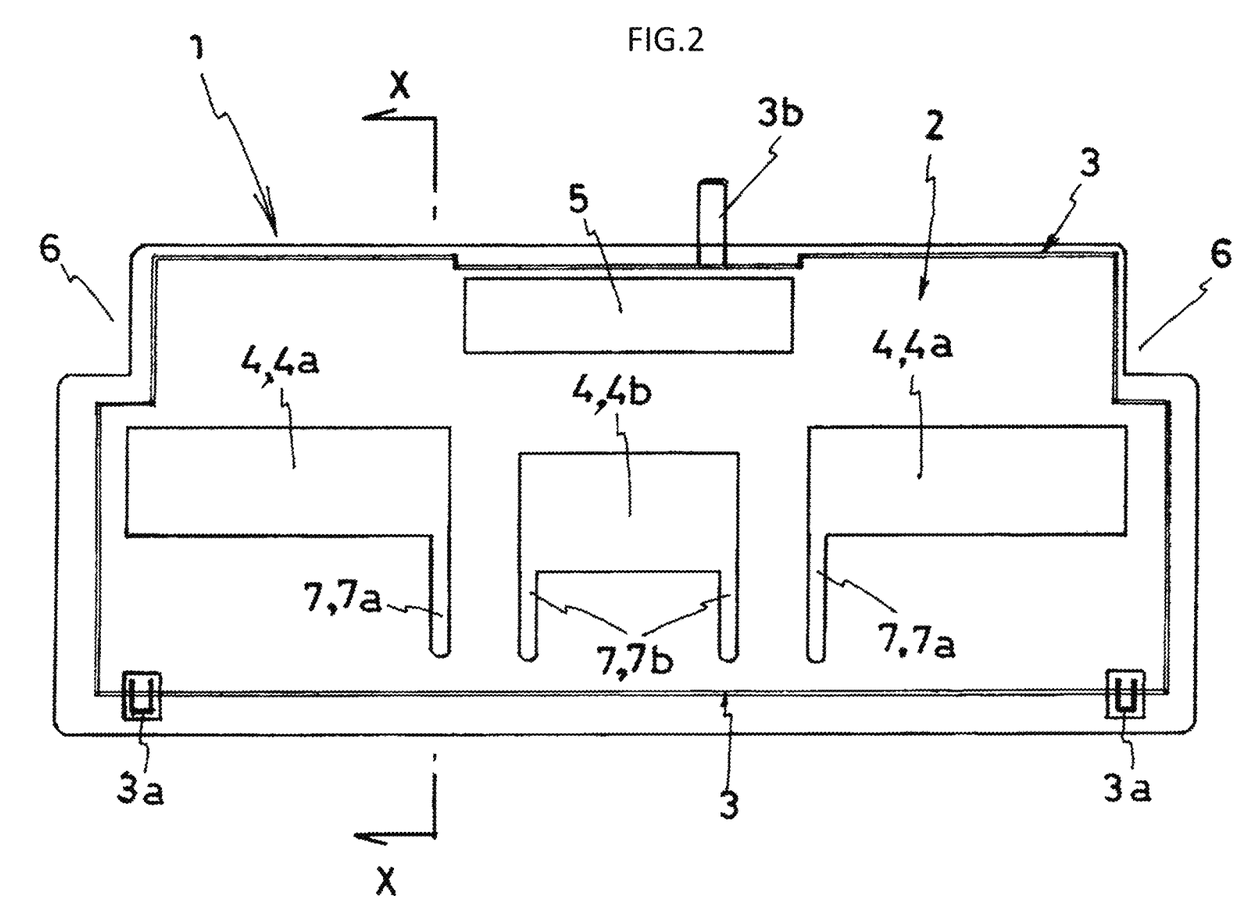
FIG. 2 is a conceptual plan view showing a buried state of a reinforcing member into an expanded beads molded article of the core material of a seat cushion for a vehicle shown in FIG. 1.

When normally used as a vehicular seat, as shown in FIG. 2, it is preferable to use the annular reinforcing member 3 formed in a substantially rectangular shape which suits for the outer peripheral shape of the expanded beads molded article 2 so as to reinforce each side and four corners of the core material 1 for a seat cushion for a vehicle when viewed from above. Further, the entire periphery of the annular reinforcing member 3 is not necessarily buried in the expanded beads molded article, and for example, a part of the reinforcing member 3 may be exposed from the expanded beads molded article 2 in order to attach the reinforcing member 3 to the vehicle body or to attach other members to the core material of a seat cushion for a vehicle.

The reinforcing member 3 according to the illustrated embodiment is formed into a substantially quadrangular annular shape from a wire member having a thickness of approximately 4.5 mm, and is formed in a front-rear asymmetric shape having different shapes in the front half and the rear half of the reinforcing member 3. Further, two metal hooks 3a for attaching to the vehicle body are joined to the wire member in the front, and one metal hook 3b for connecting to a back sheet is joined to the wire member in the rear. The number of these hooks is not particularly limited.

Figure 3:
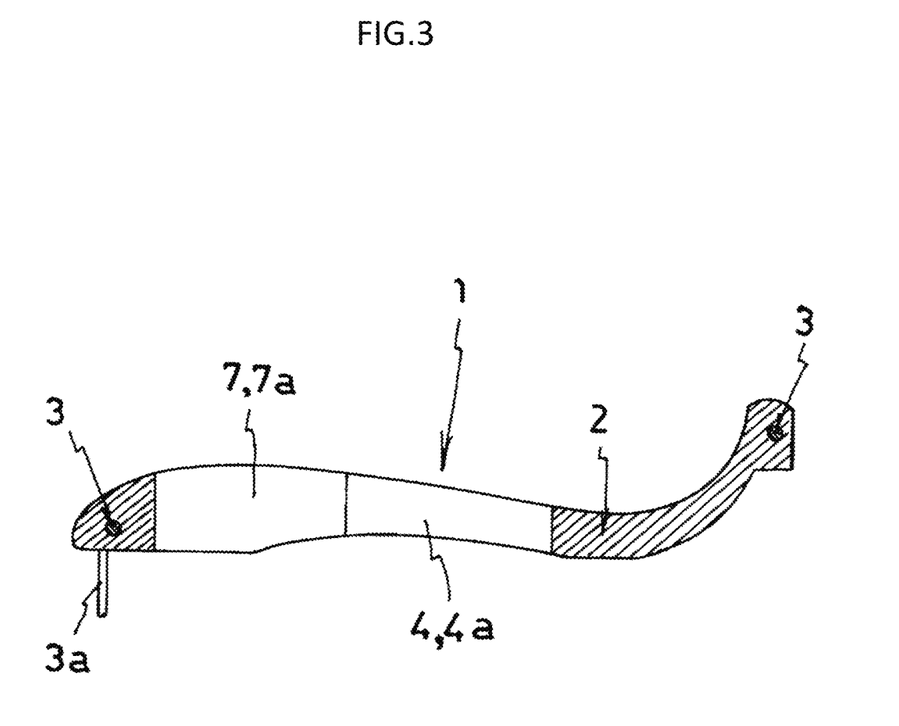
FIG. 3 is a sectional view taken along line X-X of FIG. 2.

The thermoplastic resin expanded beads molded article 2 is formed in a generally rectangular shape in a top view having a long side and a short side. The size of the expanded beads molded article 2 is appropriately designed according to the vehicle to be mounted, but the length in the long side direction is generally about 1000 mm to 1500 mm, and the length in the short side direction is generally about 400 mm to 700 mm. The thickness is 5 mm to 200 mm, and the maximum thickness is 200 mm or less, and preferably 150 mm or less. The term "thickness" means the length of the expanded beads molded article in a vertical direction in a state in which the core material of a seat cushion for a vehicle according to the present invention is attached to the vehicle. At least one missing part 4 passing through in the thickness direction for getting away from a convex portion formed in the vehicle body is formed in the expanded beads molded article 2. The size, shape, and number of the missing part 4 are appropriately designed according to the vehicle to be mounted, but two to five substantially rectangular missing parts 4 having approximately 50 mm to 300 mm long (length in the short side direction of the expanded beads molded article) and 100 mm to 500 mm width (length in the long side direction of the expanded beads molded article) are formed. In the illustrated embodiment, three missing parts 4 passing through in a substantially rectangular thickness direction along the long side direction of the expanded beads molded article 2 are formed side by side on a seating portion of an occupant. In addition, one opening portion 5 for seat belt buckle is formed in the rear portion of the expanded beads molded article 2, and cutout portions 6 for getting away from the wheel house are formed on both sides of the rear side. As shown in FIG. 3, in the thermoplastic resin expanded beads molded article 2, the front portion in front of the missing part 4, contacting with thighs of the occupant, preferably has a thickness greater than a thickness of the missing part 4 and a thickness of a rear portion behind the missing part 4, contacting with the buttocks of the occupant (the shape between the missing part and the front side of the reinforcing member 3 is thick).

Figure 1:
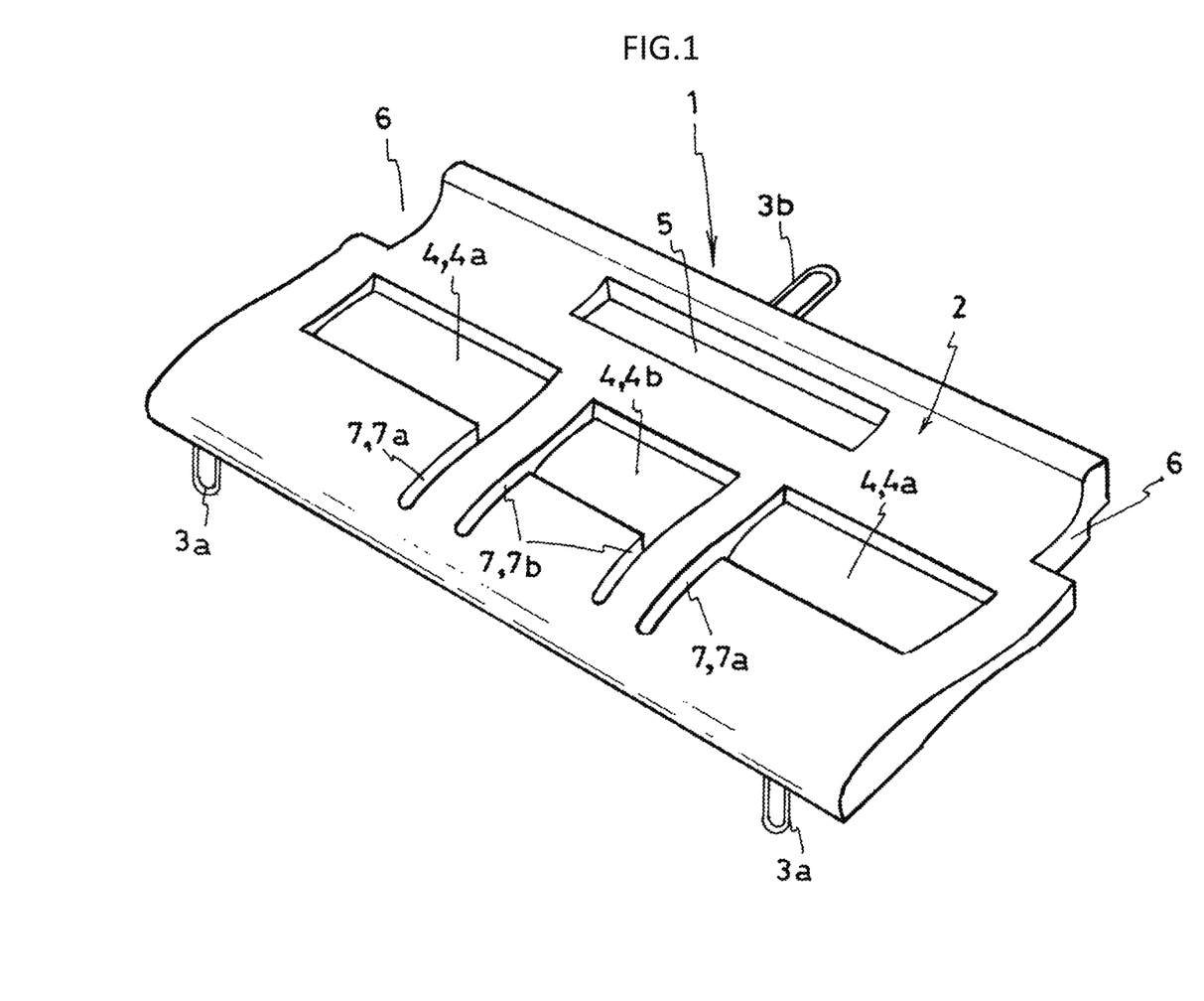
FIG. 1 is a conceptual perspective view showing an embodiment of a core material of a seat cushion for a vehicle according to the present invention.

In the missing part 4 passing through in the thickness direction formed in the expanded beads molded article 2, a slit 7 formed toward an outside of the expanded beads molded article 2 from the vicinity of the corner portion is formed in at least one corner portion of the missing part 4. In the present invention, by forming the slit 7, it is possible to effectively prevent the warping due to the difference in the shrinkage amount between the expanded beads molded article 2 and the reinforcing member 3. It is considered that this is because the slit 7 can divide the expanded beads molded article, and the slit 7 can well relieve the tensile force due to contraction since the slit 7 is formed in which the slit is oriented toward an outside of the expanded beads molded article 2 in the vicinity of the corner of the missing part 4 where the tensile force caused by the difference between the shrinkage amounts of the expanded beads molded article 2 and the reinforcing member 3 is most concentrated. From the viewpoint of causing such an effect, the slit 7 is formed toward an outside of the expanded beads molded article 2 from the vicinity of the corner portion of the missing part 4, that is, toward the circumferential of the foamed particle molded article 2 from the vicinity of the corner portion of the missing part 4. Since the tensile force remarkably appears in the long side direction of the expanded beads molded article, in order to make the slit 7 further effectively relieve the tensile force, the slit 7 is preferably formed toward an outside in the long side direction and/or the short side direction of the expanded beads molded article, the slit 7 is more preferably formed toward the front side of the thermoplastic resin expanded beads molded article, and the slit 7 is further more preferably formed toward an outside in the short side direction of the expanded beads molded article orthogonal to the long side direction of the expanded beads molded article. In addition, although the slit 7 may open only on the upper surface without opening on the lower surface side of the expanded beads molded article 2, and may open only the lower surface without opening on the upper surface side, the slit 7 preferably passes through the expanded beads molded article 2 in the thickness direction. When the slit is opened only on one surface side as described above, it is preferable to form a slit while leaving a bottom portion having a thickness of 3 mm to 25 mm. The term "in the vicinity of the corner portion" refers to a range from a position of the corner portion to a position close to the corner portion, and refers to a position of the corner portion or a position more than 0 mm and not more than 15 mm from the position of the corner portion. The slit is formed in the vicinity of the corner portion, and is preferably formed in a corner portion.

The slit 7 formed from the vicinity of the corner portion of the missing part 4 toward an outside of the expanded beads molded article 2 may be formed up to the inner side of the reinforcing member disposing on the circumferential portion of the expanded beads molded article 2, may be formed so as to intersect the reinforcing member 3 and leave the end portion of the expanded beads molded article 2 as a continuous portion, and may be formed up to the end portion of the expanded beads molded article without leaving the continuous portion, but the slit 7 is preferably formed up to the inner side of the reinforcing member 3 in consideration of rigidity as a sheet core material. In this case, since the length of the slit 7 effectively acts to relieve the tensile force, the length of the slit 7 preferably reaches the reinforcing member 3 buried in the circumferential portion of the expanded beads molded article 2, or the length of the slit 7 is preferably a length reaching an inward position away from the reinforcing member by more than 0 mm and not more than 150 mm, and more preferably a length reaching an inward position away from 20 mm to 120 mm. This is because, by forming the slit 7 to a position closer to the reinforcing member 3, the effect of dividing the expanded beads molded article 2 appears remarkably. The width of the slit 7 is preferably 50 mm or less, and more preferably 20 mm or less. The lower limit is approximately 0.1 mm. When the slit 7 is formed during in-mold molding, the width of the slit 7 is more preferably 5 mm or more.

In the illustrated embodiment, slits 7a are respectively formed from the vicinity of the corner portions on the front sides of missing parts 4a, 4a and on the inner side in the long side direction of the expanded beads molded article 2, the missing parts 4a, 4a positioning on both sides of the three missing parts 4 formed side by side in the long side direction of the expanded beads molded article 2, toward the front side of the expanded beads molded article 2. In addition, slits 7b are respectively formed from the vicinity of the two corner portions on the front side of missing parts 4b positioned at the center and toward the front side of the expanded beads molded article 2. Both of the slits 7a, 7b are formed to have a length reaching inward positions of 100 mm away from the reinforcing member 3 disposed at the circumferential portion of the expanded beads molded article 2. The widths of the slits 7a, 7b are both 10 mm.

In the present invention, the term "front side" means the direction of the core material of a seat cushion for a vehicle that corresponds to the front direction of the vehicle in a state in which the core material of a seat cushion for a vehicle according to the present invention is attached to the vehicle, and "side" means the direction of the core material of a seat cushion for a vehicle that is in the width direction of the vehicle.

The slit 7 formed from the vicinity of the corner portion of the missing part 4 of the core material 1 of a seat cushion for a vehicle of the present invention is preferably a slit provided in advance with a protrusion for forming the slit in a molding mold, and formed simultaneously with the molding of the expanded beads molded article 2 from the viewpoint of productivity, but the slit 7 may be formed by cutting the core material 1 of a seat cushion for a vehicle molded by the molding device by using a cutter, a hot wire, and the like. However, in the case where the slit 7 is formed after molding, it is necessary to form the slit 7 as quickly as possible from the core material is taken out of the mold until the warping occurs.

The core material of a seat cushion for a vehicle of the present invention described above is attached to the vehicle body. A soft synthetic resin foam such as urethane foam may be laminated on the upper surface and/or the side surface of the core material of a seat cushion for a vehicle. Further, the vehicular seat is formed by covering the outer peripheral surfaces of the front surface, the side surface, and the upper portion of the laminate with a skin material such as woven or knitted fabric, vinyl leather, or leather.

Note that the soft synthetic resin foam refers to a soft foamed urethane which is mainly used as the material of the seat cushion or a resin foam which is softened by increasing the foaming ratio with a resin material different from soft foamed urethane. By using the core material of a seat cushion for a vehicle of the present invention, the use amount of the soft synthetic resin foam can be reduced and a vehicle seat having excellent light weight can be formed.

EXAMPLES

Hereinafter, the core material of a seat cushion for a vehicle of the present invention will be described in more detail with reference to Examples, but the present invention is not limited to the Examples.

Ten core materials of a seat cushion for a vehicle of a vehicle rear seat in which the expanded beads molded article and the reinforcing member are integrated by using a molding device were manufactured.

As the expanded beads, polypropylene resin expanded beads (expansion ratio: 30 times, expanded beads diameter: approximately 4 mm) were used.

As the reinforcing member, an annular reinforcing member shown in FIGS. 2 and 3 was used. Using a metal wire member having a thickness of 4.5 mm, an annular reinforcing member was formed in a substantially quadrangular shape having a front-rear asymmetrical shape with a maximum length of 1200 mm in the long side direction and a maximum length of 550 mm in the short side direction.

The molding mold in which the reinforcing member was disposed in advance was filled with the expanded beads, and in-mold molding was performed by steam heating. In the heating method, the steam of 0.30 MPa (G) was supplied to both molds for 5 seconds in a state in which drain valves of the both molds were opened to preheating (an exhaust process), and the steam of 0.22 MPa (G) was supplied from the mold for 5 seconds to perform heating from one mold, and the steam of 0.26 MPa (G) was supplied from the other mold for 5 seconds to perform heating from the other mold, and then the steam of 0.30 MPa (G) was supplied from both molds for 3 seconds to perform the heating. After the completion of heating, the mold was air-cooled down for 30 seconds, and was water-cooled for 240 seconds, so that a core material of a seat cushion for a vehicle was obtained by integrating the expanded beads molded article and the reinforcing member.

The obtained core material of a seat cushion for a vehicle had a generally rectangular shape in the top view, and three missing parts passing through in the thickness direction were formed side by side along the long side direction of the core material of a seat cushion for a vehicle. In addition, one opening for the seat belt buckle was formed at the rear of the lightening portion, and notch portions for getting away from the wheel house were formed on both sides of the rear. The missing part positioned at the center was formed into a substantially rectangular shape having a length of 150 mm and a width of 250 mm, and the missing parts positioned on both sides were formed into substantially rectangular shapes having lengths of 150 mm and widths of 300 mm.

Next, for each of the five core materials for vehicular seat cushions, the slit 7 passing through in the thickness direction at the corner portion of the missing part was formed from the vicinity of the corner portion of the missing part toward an outside of the expanded beads molded article by using a cutter knife, immediately after the core material was removed from the mold (within 10 minutes). As shown in FIGS. 1 to 3, of the corner portions in the front side of the missing parts 4a, 4a positioned on both sides in the long side direction, the slits 7a were respectively formed toward an outside of the expanded beads molded article in the short side direction from the vicinity of corner portions positioned on the inner side of the expanded beads molded article. In addition, the slits 7b were formed toward an outside of the expanded beads molded article from the vicinity of the two corner portions on the front side of the missing part 4b positioned at the center. Both of the slits 7a and 7b were formed to have a length reaching an inner position separated 100 mm away from the reinforcing member disposed on the circumferential portion of the expanded beads molded article, and both of the slits have widths of 10 mm.

Each of the five core materials of a seat cushion for a vehicle (Examples) having the slits and the remaining five core materials of a seat cushion for a vehicle (Comparative Examples) not having the slits were subjected to stand in an atmosphere of 60° C. for 24 hours for curing, and then the warping of the core materials of vehicular seat cushions in Examples and Comparative Examples were measured by the following method, and the evaluation was performed.

The core materials in Examples and Comparative Examples had a maximum length of 1250 mm in the long side direction, a maximum length of 580 mm in the short side direction, and a maximum thickness of 80 mm.

(Method for Measuring Warping)

Figure 4:
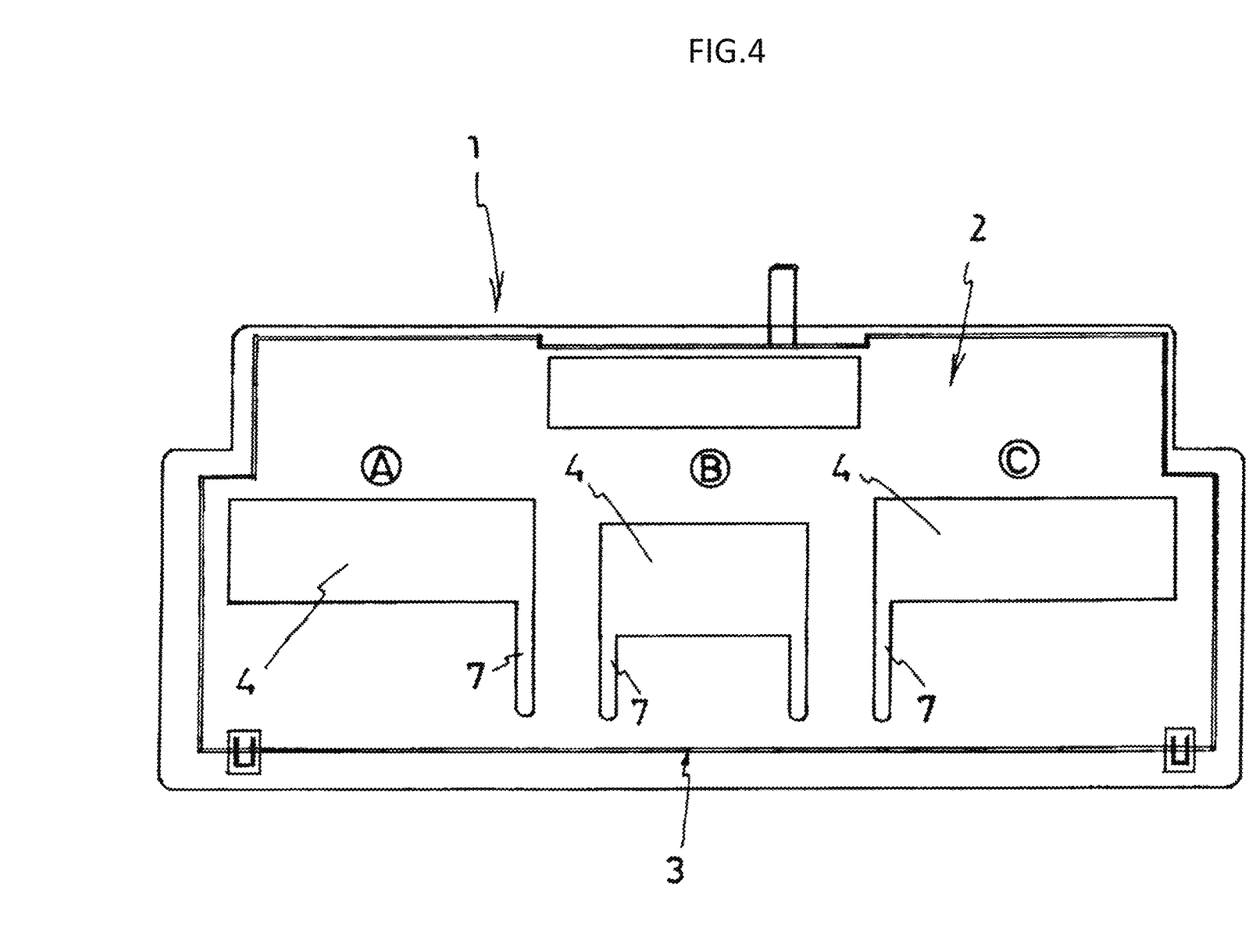
FIG. 4 is a conceptual plan view showing a measurement position of warping of an example.

The amount of displacement (mm) from the reference position was measured at the positions of A to C shown in FIG. 4 by placing the seat surface side of the core material of a seat cushion for a vehicle on an inspection jig.

It should be noted that the case of being displaced upward from the reference position is denoted by "+" and the case of being displaced downward is denoted by "−".

The arithmetic mean values of the respective measurement results in five Examples and five Comparative Examples are shown in Table 1.

TABLE 1

|  | Point A | Point B | Point C |
|---|---|---|---|
| Examples (with slit) | +9 mm | +9 mm | +10 mm |
| Comparative Example (without slit) | +15 mm | +21 mm | +15 mm |

It can be seen from Table 1 that in Examples in which the slits are formed, the amount of displacement of the product is small compared to the Comparative Examples in which no slit exists, the warping of the expanded beads molded article is reduced, and the product value is excellent.

From the above results, it was confirmed that the core material of a seat cushion for a vehicle of the present invention can provide a core material of a seat cushion for a vehicle having a light weight, less warping, and extremely excellent commodity value by forming slits under specific conditions.

The present application is based on Japanese Patent Application No. 2017-035715 filed on Feb. 28, 2017, the contents of which are incorporated herein by reference. In addition, all references cited herein are incorporated by reference in their entirety.

INDUSTRIAL APPLICABILITY

According to the present invention, since a core material of a seat cushion for a vehicle can be provided, which is made of a thermoplastic resin expanded beads molded article in which a reinforcing member is integrated, has less warping and excellent dimensional precision, a soft synthetic resin foam such as urethane foam is laminated on the core material of a seat cushion for a vehicle, and the outer peripheral surface of the laminate can be widely used as a vehicle seat by further covering the outer peripheral surface with a skin material such as woven or knitted fabric, vinyl leather, or leather.

The invention claimed is:

1. A core material of a seat cushion for a vehicle including:
    a thermoplastic resin expanded beads molded article having a substantially rectangular shape in a top view having a long side and a short side;
    an annular reinforcing member that is insert-molded in a circumferential portion of the thermoplastic resin expanded beads molded article, in which at least one missing part passing through in the thickness direction and having at least one corner is formed in the thermoplastic resin expanded beads molded article; and
    a slit extending toward an outside of the thermoplastic resin expanded beads molded article from the vicinity of the at least one corner to an end of the slit, wherein
    the slit is formed to have a length such that the end of the slit reaches an inward position greater than 0 mm and not more than 150 mm away from the reinforcing member.

2. The core material of a seat cushion for a vehicle according to claim 1, wherein
    the slit extends toward an outside in a short side direction of the thermoplastic resin expanded beads molded article.

3. The core material of a seat cushion for a vehicle according to claim 1, wherein
    the thermoplastic resin expanded beads molded article has a short side direction as a front-rear direction of the vehicle and has three missing parts arranged in a long side direction, two missing parts located on both sides in the long side direction of the three missing parts having corner portions on the front and inner side in the long side direction, the slits extending toward the front side of the thermoplastic resin expanded beads molded article from the vicinity of each corner portion.

4. The core material of a seat cushion for a vehicle according to claim 3, wherein
    the missing part located at the center of the three missing parts has two corners on the front side, the slits each extending from the vicinity of each of the corner portions toward the front side of the thermoplastic resin expanded beads molded article.

5. The core material of a seat cushion for a vehicle according to claim 1, wherein
    a maximum thickness of the thermoplastic resin expanded beads molded article is 150 mm or less.

6. The core material of a seat cushion for a vehicle according to claim 1, wherein
    the thermoplastic resin expanded beads molded article has a short side direction as a front-rear direction of the vehicle, and
    the slit extends toward the front side of the thermoplastic resin expanded beads molded article from the vicinity of the at least one corner.

* * * * *